US010880787B2

(12) United States Patent
Trang et al.

(10) Patent No.: US 10,880,787 B2
(45) Date of Patent: Dec. 29, 2020

(54) RELOCATION OF MOBILE EDGE COMPUTING SERVICES

(71) Applicant: Sony Corporation, Tokyo (JP)

(72) Inventors: Linh Trang, Aakarp (SE); Svante Alnås, Lund (SE); Jim Rasmusson, Vellinge (SE); Anders Isberg, Åkarp (SE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/322,001

(22) PCT Filed: Aug. 30, 2016

(86) PCT No.: PCT/EP2016/070397
§ 371 (c)(1),
(2) Date: Jan. 30, 2019

(87) PCT Pub. No.: WO2018/041337
PCT Pub. Date: Mar. 8, 2018

(65) Prior Publication Data
US 2019/0191341 A1   Jun. 20, 2019

(51) Int. Cl.
H04W 36/00    (2009.01)
H04W 4/50    (2018.01)
(Continued)

(52) U.S. Cl.
CPC ......... *H04W 36/0016* (2013.01); *H04W 4/50* (2018.02); *H04W 36/0061* (2013.01); *H04W 36/08* (2013.01); *H04W 88/18* (2013.01)

(58) Field of Classification Search
CPC ... H04W 4/50; H04W 36/0016; H04W 36/08; H04W 36/0061; H04W 88/18; H04W 36/00; H04W 36/0005; H04W 36/005; H04W 36/0083; H04W 36/00837; H04W 36/22; H04W 92/00; H04W 92/02; H04W 92/04; H04W 92/045; H04W 92/06; H04W 92/24; H04W 88/16; H04W 88/00; H04W 88/02; H04W 88/08; H04W 84/00; H04W 8/065; H04W 8/08; H04W 8/082; H04W 8/085; H04W 8/12; H04W 8/14;
(Continued)

(56) References Cited
U.S. PATENT DOCUMENTS
10,172,064 B2 *  1/2019  Agrawal et al. ...... H04W 36/36
10,362,522 B2 *  7/2019  Pillay-Esnault
(Continued)

FOREIGN PATENT DOCUMENTS
WO    2015/099587 A1    7/2015

OTHER PUBLICATIONS

International Search Report and Written Opinion from counterpart International Patent Application No. PCT/EP2016/070397 dated May 26, 2017, 22 pages.
(Continued)

Primary Examiner — Meless N Zewdu
(74) Attorney, Agent, or Firm — Tucker Ellis LLP

(57) ABSTRACT

A service provided by a mobile edge server is relocated. A base station associated with the mobile edge server sends a control message to a mobile edge system, the control message being indicative of a predicted handover of the terminal from the base station to one or more candidate base stations.

18 Claims, 12 Drawing Sheets

(51) Int. Cl.
*H04W 36/08* (2009.01)
*H04W 88/18* (2009.01)

(58) Field of Classification Search
CPC ......... H04W 12/0017; H04W 36/0066; H04W 72/04; H04W 72/0406; H04W 72/0426; H04W 76/00; H04W 76/10; H04W 76/15; H04W 76/27; H04W 76/20; H04W 8/10; H04W 8/20; H04W 28/0226; H04W 28/0804; H04W 36/0011; H04W 4/02; H04W 36/00835; H04W 36/0077; H04W 36/0072

See application file for complete search history.

(56) References Cited

U.S. PATENT DOCUMENTS

| | | | |
|---|---|---|---|
| 2002/0009134 A1* | 1/2002 | Fischel et al. | 375/224 |
| 2002/0193116 A1* | 12/2002 | Agrawal et al. | 455/445 |
| 2008/0240039 A1* | 10/2008 | Parekh et al. | 370/331 |
| 2011/0007713 A1* | 1/2011 | Kobayashi et al. | 370/332 |
| 2012/0281570 A1* | 11/2012 | Jung et al. | 370/252 |
| 2015/0079991 A1* | 3/2015 | Koskinen et al. | H04W 36/0083 |
| 2015/0146689 A1* | 5/2015 | Fu et al. | H04W 36/245 |
| 2016/0095041 A1 | 3/2016 | Agrawal | |
| 2017/0237607 A1* | 8/2017 | Smith | H04L 41/08 |
| 2018/0351824 A1* | 12/2018 | Giust et al. | H04L 41/20 |
| 2019/0037474 A1* | 1/2019 | Xu et al. | H04W 40/38 |
| 2019/0045409 A1* | 2/2019 | Rasanen et al. | H04W 36/12 |

OTHER PUBLICATIONS

"Mobile Edge Computing (MEC); Framework and Reference Architecture", Group Specification, European Telecommunications Standards Institute (ETSI), ETSI GS MEC 003 No. V1.1.1, Mar. 2016, 18 pages.

Ha, Kiryong et al., "Adaptive VM Handoff Across Cloudlets", School of Computer Science, Carnegie Mellon University, Jun. 2015, 28 pages.

* cited by examiner

FIG. 10

5011 receiving a first control message indicative of a predicted handover of a terminal from a source base station of a plurality of base stations of a radio access network of a cellular network to at least one candidate base station of a plurality of base stations of the radio access network

RELOCATION OF MOBILE EDGE COMPUTING SERVICES

TECHNICAL FIELD

Various embodiments relate generally to mobile edge computing systems. Various embodiments relate specifically to relocating services between mobile edge servers.

BACKGROUND

European Telecommunications Standards Institute (ETSI) industry specification group (ISG) on mobile edge computing (MEC) aims to provide information technology (IT) and cloud-computing capabilities close to the edge of the radio access network (RAN) of a cellular network. Due to the close proximity between MEC hardware such as mobile edge (ME) servers and the user equipment (UE; or terminal), MEC facilitates low latency services.

MEC is described in Mobile-Edge Computing—Introductory Technical White Paper, September 2014 (Contributors: Huawei, IBM, Intel, Nokia Networks, NTT DOCOMO, Vodafone), which is hereby incorporated herein by reference in its entirety. MEC is further described by: ETSI ITS (14)01_038: ISG MEC #1 Minutes of Plenary Meeting, which is also hereby incorporated herein by reference in its entirety.

Reference implementations of MEC systems face certain restrictions and drawbacks. For example, due to the mobility of the UE, relocation of services between different ME servers may be required. For example, due to user mobility, the ME system may detect that the current ME server hosting the service (source ME server) is not optimal and may need to relocate—sometimes also referred to as migrate—the service to a new ME server (target ME server). The target ME server may be more appropriate in terms of, e.g., geographical location, load balancing, latency etc. if compared to the source ME server. It has been observed that the relocation of a service from the source ME server to the target ME server can introduce significant latency according to MEC reference implementations.

SUMMARY

Therefore, a need exists for advanced techniques of relocating services in an ME system. In particular, a need exists for techniques of relocating services in an ME system which overcome or mitigate at least some of the above-identified restrictions and drawbacks.

This need is met by the features of the independent claims. The dependent claims define embodiments.

In an example, a base station of a radio access network of the cellular network includes at least one interface. The at least one interface is configured to communicate with a terminal on a radio channel of the radio access network. The at least one interface is further configured to communicate with the ME server of an ME system. The base station further includes at least one processor configured to provide a service of the ME server to the terminal. The at least one processor is further configured to send a first control message to the ME system. The first control message is indicative of a predicted handover of the terminal from the base station to at least one candidate base station.

In an example, a method includes providing a service of an ME server of an ME system to a terminal via a radio channel of a radio access network of a cellular network. The method further includes sending a first control message to the ME system. The first control message is indicative of a predicted handover of the terminal to at least one candidate base station.

In an example, a computer program product includes program code that may be executed by at least one processor. Executing the program code causes the at least one processor to perform a method. The method includes providing a service of an ME server of an ME system to a terminal via a radio channel of a radio access network of a cellular network. The method further includes sending a first control message to the ME system. The first control message is indicative of a predicted handover of the terminal to at least one candidate base station.

In an example, a computer program includes program code that may be executed by at least one processor. Executing the program code causes the at least one processor to perform a method. The method includes providing a service of an ME server of an ME system to a terminal via a radio channel of a radio access network of a cellular network. The method further includes sending a first control message to the ME system. The first control message is indicative of a predicted handover of the terminal to at least one candidate base station.

In an example, an ME control node of an ME system includes at least one interface configured to communicate with a plurality of base stations of a radio access network of a cellular network. The at least one interface is further configured to communicate with a plurality of ME servers of the ME system associated with the plurality of base stations. The ME control node further includes at least one processor configured to receive a first control message indicative of a predicted handover of a terminal from a source base station of the plurality of base stations to at least one candidate base station of the plurality of base stations.

In an example, a method includes an ME control node of an ME system receiving a first control message. The first control message is indicative of a predicted handover of a terminal from a source base station of a plurality of base stations of a radio access network of a cellular network to at least one candidate base station of a plurality of base stations of the radio access network.

In an example, a computer program product includes program code that may be executed by at least one processor. Executing the program code causes the at least one processor to perform a method. The method includes an ME control node of an ME system receiving a first control message. The first control message is indicative of a predicted handover of a terminal from a source base station of a plurality of base stations of a radio access network of a cellular network to at least one candidate base station of a plurality of base stations of the radio access network.

In an example, a computer program includes program code that may be executed by at least one processor. Executing the program code causes the at least one processor to perform a method. The method includes an ME control node of an ME system receiving a first control message. The first control message is indicative of a predicted handover of a terminal from a source base station of a plurality of base stations of a radio access network of a cellular network to at least one candidate base station of a plurality of base stations of the radio access network.

In an example, an ME server of an ME system includes at least one interface configured to communicate with a source base station of a radio access network of a cellular network. The at least one interface is further configured to communicate with an ME control node of the ME system. The at least one interface is further configured to communicate with a plurality of further ME servers. The at least one processor is configured to provide a service to the terminal. The terminal is connected via a radio channel of the radio access network with a source base station. The at least one processor is further configured to receive a third control message. The third control message instructs to implement a shadow copy of the service at at least one candidate ME server of the plurality of further ME servers. The at least one processor is further configured to implement a shadow copy at the at least one candidate ME server in response to receiving the third control message.

In an example, a method includes providing a service to a terminal. The terminal is connected via a radio channel of a radio access network of a cellular network with a source base station. The method further includes receiving a third control message. The third control message instructs to implement a shadow copy of the service at at least one candidate ME server of a plurality of further ME servers of an ME system. The method further includes implementing the shadow copy at the at least one candidate ME server in response to receiving the third control message.

In an example, a computer program product includes program code that may be executed by at least one processor. Executing the program code causes the at least one processor to perform a method. The method includes providing a service to a terminal. The terminal is connected via a radio channel of a radio access network of a cellular network with a source base station. The method further includes receiving a third control message. The third control message instructs to implement a shadow copy of the service at at least one candidate ME server of a plurality of further ME servers of an ME system. The method further includes implementing the shadow copy at the at least one candidate ME server in response to receiving the third control message.

In an example, a computer program includes program code that may be executed by at least one processor. Executing the program code causes the at least one processor to perform a method. The method includes providing a service to a terminal. The terminal is connected via a radio channel of a radio access network of a cellular network with a source base station. The method further includes receiving a third control message. The third control message instructs to implement a shadow copy of the service at at least one candidate ME server of a plurality of further ME servers of an ME system. The method further includes implementing the shadow copy at the at least one candidate ME server in response to receiving the third control message.

In an example, an ME server of an ME system includes at least one interface. The at least one interface is configured to communicate with a target base station of a radio access network of a cellular network. The at least one interface is further configured to communicate with an ME control node of the ME system. The at least one interface is further configured to communicate with a source ME server. The ME server further includes at least one processor configured to receive a third control message. The third control message instructs to implement a shadow copy of a service provided by the source ME server to a terminal. The at least one processor is further configured to implement the shadow copy in response to receiving the third control message.

In an example, a method includes receiving a third control message instructing to implement a shadow copy of a service provided by a source ME server of an ME system to a terminal. The method further includes implementing the shadow copy in response to receiving the third control message.

In an example, a computer program product includes program code that may be executed by at least one processor. Executing the program code causes the at least one processor to perform a method. The method includes receiving a third control message instructing to implement a shadow copy of a service provided by a source ME server of an ME system to a terminal. The method further includes implementing the shadow copy in response to receiving the third control message.

In an example, a computer program includes program code that may be executed by at least one processor. Executing the program code causes the at least one processor to perform a method. The method includes receiving a third control message instructing to implement a shadow copy of a service provided by a source ME server of an ME system to a terminal. The method further includes implementing the shadow copy in response to receiving the third control message.

It is to be understood that the features mentioned above and those yet to be explained below may be used not only in the respective combinations indicated, but also in other combinations or in isolation without departing from the scope of the invention.

BRIEF DESCRIPTION OF THE DRAWINGS

FIG. 10 is a flowchart of a method according to various embodiments.

DETAILED DESCRIPTION OF EMBODIMENTS

Figure 1:
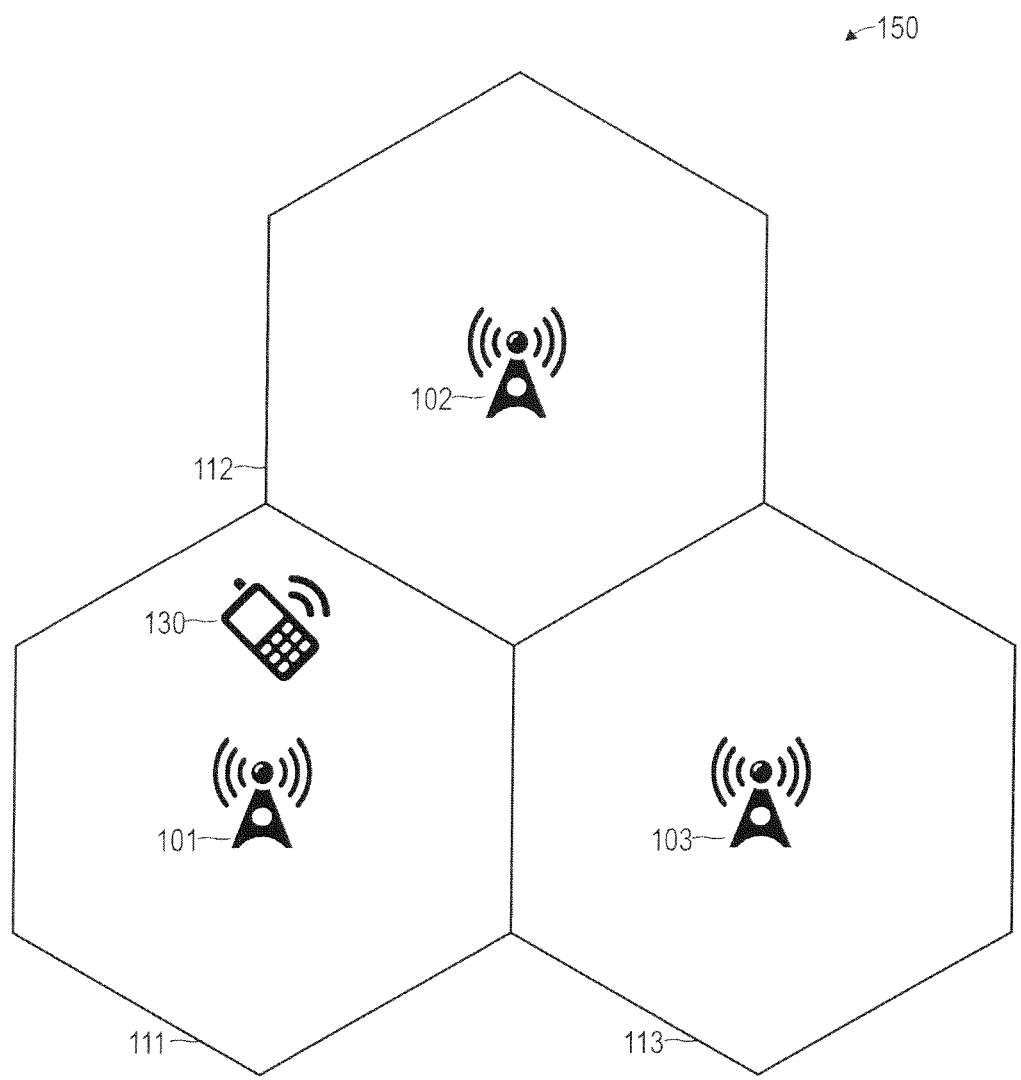
FIG. 1 schematically illustrates a plurality of cells of a radio access network of a cellular network according to various embodiments.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of MEC are described. MEC can facilitate providing ultra-low latency services to UEs. ME computing typically relies on deployment of ME servers providing or hosting the service within a radio access network or close to equipment of a radio access network of a cellular network. For example, the ME servers may be co-located with base stations of the radio access network. For example, the ME servers may be operated by the same operator as the radio access network. For example, the ME servers may have a high-throughput backbone connection to the base stations. For example, the ME servers may offer services such as cloud-based computing. The services offered by the ME servers to a UE may benefit from low latency. For example, the latency may be less than 30 ms, optionally less than 10 ms. Due to such low latency, latency-sensitive services may be provided. For example, the services may relate to server-based gaming or augmented reality.

In some examples, the ME servers together with an ME control node implement an ME system. For example, the ME control node may perform control functionality with respect to the ME servers. Such control functionality may include: triggering relocation of services between the ME servers; load balancing; deployment of additional ME servers; etc.

According to various examples, relocation of a service from a source ME server to a target ME server is described. For example, such relocation of the service may be triggered due to various circumstances, including: mobility of the UE to which the service is provided; load balancing between the source ME server and the target ME server; etc.

According to various examples, techniques of synchronizing the relocation of the service from the source ME server to the target ME server with a handover of the UE from a source base station to a target base station are described. Here, synchronization can relate to executing the relocation of the service and the handover approximately at the same point in time. For example, synchronization can relate to executing the relocation of the service and the handover during at least partially overlapping time intervals.

When synchronizing the relocation of the service from the source ME server to the target ME server with the handover of the UE between cells of the radio access network, additional disruption of the service by the relocation—beyond what is caused by the handover—can be mitigated. In particular, disruption of the service by the relocation can be masked behind the handover. Thereby, the user may not experience additional significant degradation of the service beyond what is inevitably experienced due to the handover.

According to various examples, the radio access network may provide information on the predicted handover to the ME system. For example, the radio access network may provide information on the predicted handover to one or more of the ME servers of the ME system and/or to the ME controller. This may facilitate anticipation of and preparation for the handover, some time before the handover is actually executed. For example, such information on the predicted handover may be indicative of candidate base stations. Candidate base stations may be such base stations to which the handover is likely to occur. As such, candidate base stations qualify as being a target base station of the handover. For example, alternatively or additionally, such information on the predicted handover may be indicative of an estimated time for the handover. For example, the estimated time may be defined in a common time reference of the ME system and the radio access network. A respective timing information may be provided. As such, in some examples it is possible that the radio access network and the ME system are time synchronized. For example, alternatively or additionally, such information on the predicted handover may include a ranking between the candidate base stations. The ranking may be indicative of a likelihood with which each candidate base station will be the target base station for which the handover is actually implemented.

Based on such information on the predicted handover, the ME system can implement advanced control functionality with respect to the relocation of a service along with the handover. For example, based on such information on the predicted handover, it may be possible to judge prospectively whether the handover requires a relocation of the service from a source ME server to a target ME server, e.g., in view of latency requirements of the service or depending on a deployment scenario where one and the same ME server may be associated with, both, the source base station and the target base station. For example, based on such information on the predicted handover, it may be possible to prepare for the expected relocation before actually executing the relocation.

Such preparation of the expected relocation may involve implementing a shadow copy of the service currently provided by the source ME server at the candidate ME servers. The shadow copy may relate to duplicating the runtime state of the program code of the service at a cache of the candidate ME servers. This may facilitate a hot swap where instant takeover of a given one of the candidate ME servers—e.g., without a need of additional data transfer of data indicative of the runtime state of the service—becomes possible. Such preparation of the expected relocation may involve keeping the shadow copy of the service up-to-date at the candidate ME servers, i.e., may include synchronizing the service currently provided by the source ME server with the shadow copies at the candidate ME servers.

FIG. 1 illustrates aspects with respect to the cellular network. In particular, FIG. 1 illustrates aspects with respect to a radio access network 150 of the cellular network. In the example of FIG. 1, three base stations 101-103 form the radio access network 150. In other examples, a larger number of base stations could be used.

The base station 101 serves a cell 111 of the cellular network. As such, the base station 101 is sometimes referred to as serving base station for UEs 130 located within the cell 111 and connected with the cellular network via the base station 101.

The base station 102 serves and adjacent cell 112. Also, the base station 103 serves an adjacent cell 113.

Due to mobility of the UE 130, the UE 130 may at one point come close to the cell edge of the cell 111. Typically, in such a cell edge scenario, the quality of communicating on a radio channel between the UE 130 and the base station 101 deteriorates. The quality of communicating on the radio channel can be measured by the base station 101. Sometimes, measuring the quality of communicating on the radio channel is referred to as channel sounding. For example, channel sounding may employ well-defined pilot signals:

based on a receive property of the pilot signals, it is then possible to conclude on the quality of communicating on the radio channel.

For example, at one point the quality of communicating on the radio channel may fall below a certain threshold. This may be due, e.g., the UE 130 moving away from the base station 101 and towards the base station 102. Then, a handover from the initially serving base station 101—which, in the context of the handover is often referred to as the source base station—to the base station 102 (target base station) may occur. Once the handover is completed, the UE 130 is connected with the cellular network via the base station 102 which is then the new serving base station.

Based on the channel sounding or by other techniques such as trading the position of the UE 150, it is possible to anticipate the handover some time before the handover is executed. Such prediction of the handover can be used according to various examples described herein.

Figure 2:
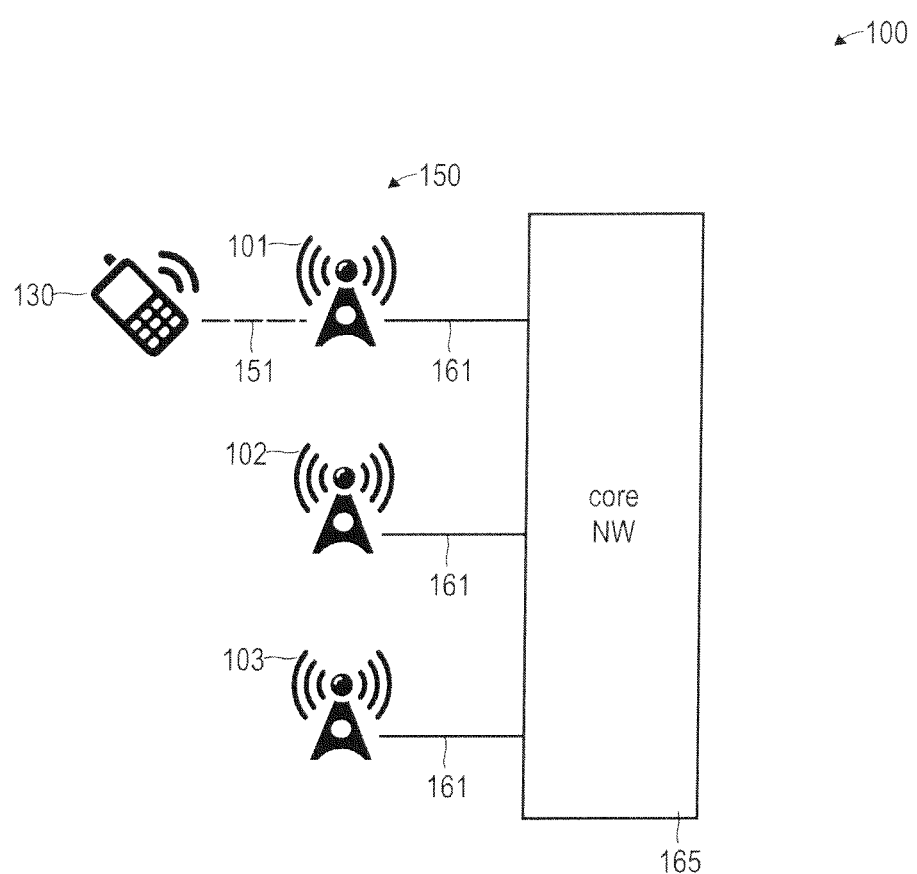
FIG. 2 schematically illustrates the cellular network according to various embodiments.

FIG. 2 illustrates aspects with respect to the cellular network 100. In FIG. 2, the radio channel 151 11 via which the terminal 130 is communicating with the base station 101 is illustrated. The communication on the radio channel 151 can be bidirectional including downstream communication from the base station 101 to the terminal 130 and upstream communication from the terminal 130 to the base station 101.

FIG. 2 illustrates a core network 165 of the cellular network 100. The base stations 101-103 are connected by core network interfaces 161 with each other and the core network 165.

For example, the cellular network 100 can be a 3GPP specified cellular network such as 2G, 3G, 4G, or upcoming 5G. For example, in the context of 3GPP 4G Long Term Evolution (LTE) cellular networks 100, the radio access network 150 is sometimes referred to as evolved Universal Mobile Telecommunications System Terrestrial Radio Access (E-UTRAN). Other examples of the cellular network 100 include Institute of Electrical and Electronics Engineers (IEEE)—specified networks, e.g., according to the 802.11x Wi-Fi protocol or the Bluetooth protocol. Further examples include a 3GPP Narrowband Internet of Things (NB-IoT) or Machine Type Communication network.

Figure 3:
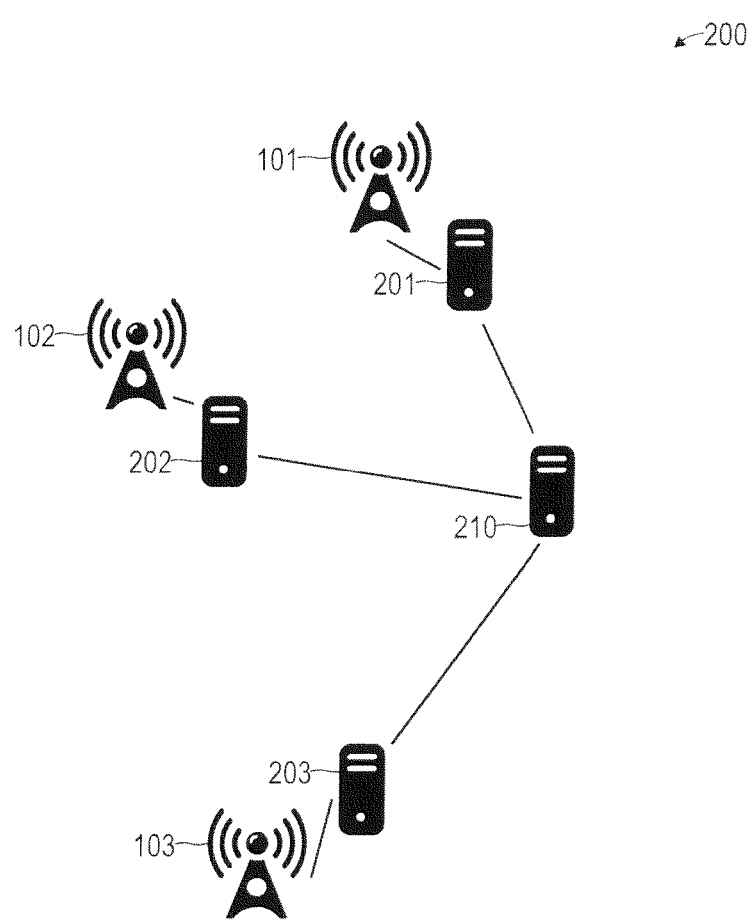
FIG. 3 schematically illustrates an ME system comprising ME servers associated with base stations of the radio access network and an ME control node according to various embodiments.

FIG. 3 illustrates aspects with respect to an ME system 200. The ME system 200 includes ME servers 201-203. The ME server 201 is associated with the base station 101; the ME server 202 is associated with the base station 102; and the ME server 203 is associated with the base station 103. Services hosted by a given one of the UE servers 201-203 are typically provided to UEs connected to the respectively associated base station 101-103.

While in the example of FIG. 3 there is a one-to-one correspondence between ME servers 201-203 and base stations 101-103, in other examples, it is also possible that more than a single base station 101-103 is associated with a given ME server 201-203.

For example, the ME servers 201-203 could be co-located at the same site as the associated base station 101-103. By deploying the ME servers 201-203 in the radio access network 150, a comparably low latency for communicating between the ME servers 201-203 and the associated base stations 101-103 may be achieved. For example, the latency of communicating between a given ME server 201-203 and the associated base station 101-103 may be below 30 milliseconds, preferably below 10 microseconds, more preferably below 1 microsecond. Sometimes, such a dimension of the latency is also referred to as ultra-short latency.

Control of the ME system 200 is provided by an ME control node 210. In the example of FIG. 3, the ME controller 210 is a dedicated entity. However, in other examples, it would also be possible that the ME control node 210 is co-located with one or more of the ME servers 201-203.

For example, the ME control node 210 can perform tasks of load-balancing between the various ME servers 201-203. For example, the ME control node 210 can keep track of a computational load imposed to the various ME servers 201-203.

For example, the ME control node 210 can perform tasks with respect to relocating a service from a source ME server 201-203 to a target ME server 201-203. For example, relocation of the service may be triggered due to mobility of the UE to which the service is provided. For example, relocation of the service may be due to a handover between cells 111-113 of the radio access network 150 of the cellular network 100.

Figure 4:
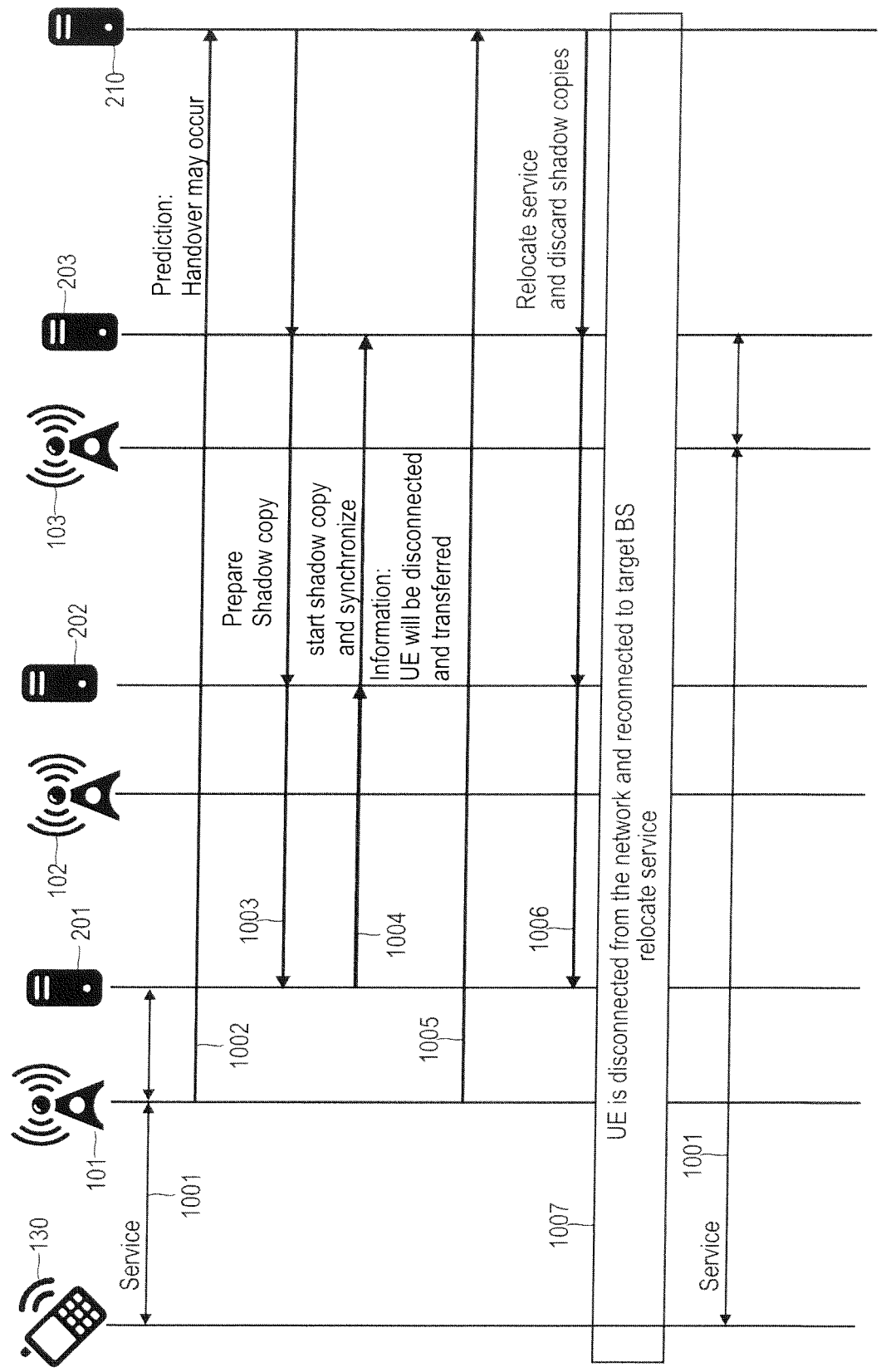
FIG. 4 is a signaling diagram of the radio access network and the ME system according to various embodiments.

FIG. 4 illustrates aspects with respect to relocating a service from a source ME server 201 to a target ME server 203.

Initially, the service 1001 is provided by the source ME server 201 via the base station 101 to the UEs 130. Thus, the source ME server 201 hosts the service 1001. For example, providing the service 1001 may include communication of uplink data from the UE 130 to the base station 101 and further onwards to the source ME server 201. Alternatively or additionally, providing the service 1001 may include communication of downlink data from the ME server 201 via the base station 101 and to the UE 130. For example, the service 1001 may correspond to augmented reality and/or gaming applications running at the UE 130.

Because the ME server 201 is associated with the base station 101, a particularly low latency can be implemented for the service 1001. For example, the service 1001 may have an end-to-end latency of not more than 30 milliseconds, optionally of not more than 10 milliseconds, further optionally of not more than 1 millisecond.

Next, the base station 101 detects that the UE 130 is located close to the edge of the cell 111—based on the tracked position—will be located close to the cell edge, soon. For example, the base station 101 may be configured to sound the radio channel 151 to detect that the UE 130 is located close to the edge of the cell 111. For example, the base station 101 may monitor the mobility of the UE 130. For example, based on the mobility of the UE 130 in combination with an estimate of the extents of the cell 111, the base station 101 may detect that the UE 130 is located close to the edge of the cell 111.

Based on such information, the base station 101 can predict that a handover is likely to occur some time in the future. A handover corresponds to disconnecting the UE 130 from the source base station 201 and connecting the UE 130 with a target base station.

For example, once the base station 101 detects that the UE 130 is located close to the edge of the cell 111, it may not yet be predictable at sufficient certainty whether the target base station will be the base station 102 or rather the base station 103. In particular, both, the cell 112 of the base station 102, as well as the cell 113 of the base station 103 are adjacent to the cell 111 of the source base station 101. As such, a significant likelihood exists that the UE 130 will enter the cell 112; just like a significant likelihood exists that the UE 130 will enter the cell 113.

Therefore, it is possible that the base station 102, as well as the base station 103 are classified as candidate base stations with respect to the predicted handover.

The base station 101 then sends a control message 1002 to the ME control node 210. The control message 1002 is indicative of the predicted handover of the terminal 130. For example, the control message 1002 may be indicative of the candidate base stations 102, 103. For example, the control message 1002 may be indicative of an identity of the candidate base stations 102, 103. For example, the identity of the candidate base stations 102, 103 may be expressed as the cell identification. For example, the control message 1002 may include a timing information indicative of a predicted time of the predicted handover. For example, the control message 1002 may include a likelihood for each candidate base station 102, 103 indicative of the likelihood with which the respective candidate base station 102, 103 will be the target base station.

The control message 1002 is subsequently received by the ME control node 210. Thereby, the ME control node 210 is informed of the predicted handover. For example, the ME control node 210, based on the control message 1002, may conclude that a handover of the terminal 130 to one of the candidate base stations 102, 103 is likely to occur within the near future.

Then, the mobile edge control node 210 can be configured to check if the source ME server 201—which is currently providing the service 1001 to the UE 130—corresponds to the ME servers 202, 203 associated with the candidate base stations 102, 103. For example, it is possible that a certain ME server is associated with more than a single base station. Then, it is possible that a handover of the terminal 130 does not result in a change of the associated ME server. Here, relocation of the service 1001 may not be required.

In the example of FIG. 4, the ME control node 210 detects that the source ME server 201—which is currently providing the service 1001 to the UE 130—does not correspond to the ME servers 202, 203 associated with the candidate base stations 102, 103, i.e., the candidate ME servers 202, 203. Because of this, the ME control node 210 takes appropriate action to prepare for relocation of the service 1001 to the candidate edge servers 202, 203.

In particular, the ME control node 210 sends a control message 1003 to the source ME server 201, as well as to the candidate ME servers 202, 203. The control message 1003 instructs to implement a shadow copy of the service 1001 provided by the source ME server 201 at the candidate ME servers 202, 203. By means of the shadow copy, a particularly fast relocation can be implemented. For example, the relocation can be implemented according to a so-called hot swap. Here, the necessary data for providing the service 1001 is pre-provisioned at the target ME server: when executing the relocation, provisioning of the service 1001 can immediately commence—e.g., without the need of transferring additional data from the source ME server to the target ME server.

While in the example of FIG. 4, the control message 1003 is sent to, both, the source ME server 201, as well as the candidate ME servers 202, 203, in other examples, it would also be possible to send the control message 1003 to either the source ME server 201, or the candidate ME servers 202, 203.

In response to receiving the control message 1003, the shadow copy is implemented at each one of the candidate mobile edge servers 202, 203. For this, the source ME server 201 transmits data 1004 to the candidate ME servers 202, 203 which is then received by the UE servers 202, 203. For example, the shadow copy may include at least one of the following: an application context of the service 1001; an operational state of at least one processing unit of the source ME server 201 executing the service 1001; and a program code of the service 1001. E.g., the program code may correspond to executable binaries. The operational state may correspond to current states of volatile memory such as L1 cache, L2 cache, L3 cache, etc. For example, the shadow copy may facilitate immediate execution of the service 1001, e.g., at an arbitrary point during runtime. For example, this data 1004 may be written to a memory at the candidate ME servers 202, 203.

After triggering the shadow copy, a handover of the UE 130 has not yet been executed. For the time being, provisioning of the service 1001 by the source ME server 201 continues. In order to prevent the shadow copies at the candidate ME servers 202, 203 from becoming outdated, the source ME server 201 and the candidate ME service 202, 203 repeatedly synchronize the service 1001 with the shadow copy at the candidate ME servers 202, 203. For example, while synchronizing the service 1001, all user input or uplink data provided by the UE 130 may also be forwarded to the candidate ME servers 202, 203 to keep the shadow copy up to date.

Then, the handover of the terminal 130 is directly imminent. For example, the base station 101—e.g., by monitoring the mobility of the UE 130 and/or by sounding the radio channel 151—may detect that the quality of communicating on the radio channel 151 has further deteriorated below a certain predefined threshold. Then, the source base station 101 sends a control message 1005 to the ME control node 210. The control message 1005 is indicative of execution of the predicted handover. At the time of sending the control message 1005, the source base station 101 may have decided on a target base station: in the example of FIG. 4, the target base station is the base station 103. The control message 1005 may directly trigger relocation of the service 1001. For example, it is possible that the control message 1005 is indicative of an identity of the target base station 203.

In some examples, it is also possible that the control message 1005 includes a timing information. The timing information is optional. The timing information may be indicative of the point in time at which the handover is executed. For example, the timing information may include a timestamp. Alternatively or additionally, the timing information may include a time frame or a time range. For example, the timing information could indicate a time period or a point in time. For example, the timing information could be relatively defined, e.g., specify that the point in time at which the handover is executed is going to happen "soon", in a "medium" time ahead, or a "long" time ahead. In different examples, a different resolution of the timing information may be used. For example, the timing information may be defined in a common time reference of the ME system 200 and the radio access network 150 of the cellular network 100. For example, the timing information may indicate the time duration until execution of the handover from the point in time of sending the control message 1005. For example, the timing information may be determined by the base station 101 taking into account a statistical model of previous handovers.

Based on the timing information, it is possible to synchronize execution of the handover of the terminal 130 with relocation of the service 1001 to the ME server 203 associated with the target base station 103 (target ME server). The control message 1005 is then received by the ME control node 210. Thereby, the ME control node 210 is informed of the specific time at which the handover of the terminal 130 is going to be executed.

In response to receiving the control message 1005, the ME control node 210 triggers relocation of the service 1001 from the source ME server 201 to the target ME server 203. This may be done in accordance with the timing information. For this, the ME server 210 sends a control message 1006 to the source ME server 201, the target ME server 203, as well as to the candidate ME server 202. For example, if the control message 1005 includes the timing information, the ME control node 210 can send the control message 1006 in accordance with the timing information, e.g., at the time indicated by the timing information. For example, if the control message 1005 includes the timing information, the ME control node 210 can send the control message 1006 also including the timing information. Thereby, the ME control node 210 can trigger relocation of the service 1001 in accordance with the timing information.

In response to receiving the control message 1006, the ME server 202 may release all resources previously dedicated to maintaining the shadow copy. In particular, has now turned out that the ME server 202 will not be the target ME server providing the service after the handover 130. Therefore, there is no need anymore to provide the shadow copy at the ME server 202. Resources can be freed.

Then, at block 1007, the handover of the terminal 130 is executed: i.e., the terminal 130 is disconnected from the radio access network and reconnected with the radio access network 150 via the target base station 103.

At the same time, during block 1007, the relocation of the service 1001 from being provided by the source ME server 201 to being provided by the target ME server 203 is executed.

In particular, the relocation of the service 1001 is based on the shadow copy. E.g., the data provided to the target ME server 203 prior to block 1007 as part of signaling of the data 1004 is used for relocation of the service 1001. By making use of the shadow copy, transmitting additional data related to the run-time state of the service 1001 from the source ME server 201 to the target ME server 203 while executing the relocation at block 1007 is not necessary. Thereby, the duration required for the relocation can be reduced. For example, the relocation may be performed in a time duration which is shorter than the time duration required for the handover.

For example, in order to ensure that the relocation performs smoothly, at the time of relocating, the source ME server 201 may check validity of the shadow copy of the target ME server 203. For example, this may involve comparing a checksum of the contents of the memory allocated to the service 1001 with the respective checksum at the target ME server 203.

The target ME server 203 then activates the shadow copy as a life instance of the service 1001. In response to said activating of the shadow copy as the life instance, the target ME server 203 continues to provide the service 1001 to the terminal 130 via the target base station 103. Now, the target ME server 203 hosts the service 1001. At that time, the handover between the source base station 101 and the target base station 103 has also completed. For example, additional latency may not be introduced into the service 1001 beyond the latency which is inherently provided due to the handover. As such, the relocation can be masked by the handover.

Above, various examples have been described with respect to a timing information which is included in the control message 1005. Here, the timing information is indicative of the time at which the handover is going to be executed. Alternatively or additionally, it would also be possible that a timing information is included in the control message 1002. Here, the timing information can be indicative of the time at which the handover is likely to be executed: as such, it is possible that a timing information included in the control message 1002 has a comparably large uncertainty, because it is not yet clear exactly when the handover will be executed. Nonetheless, based on such a timing information included in the control message 1002, it may be possible that the ME control node 210 estimates when it is required to send the control message 1003 instructing to implement the shadow copy. For example, based on the timing information and an amount of the data 1004 which needs to be transmitted to the candidate ME service 202, 203 to implement the shadow copy, it may be possible to judge when it is required to trigger the shadow copy. Thereby, resource allocation due to the shadow copies at the candidate ME service 202, 203 can be reduced by postponing implementation of the shadow copy as long as possible.

Figure 5:
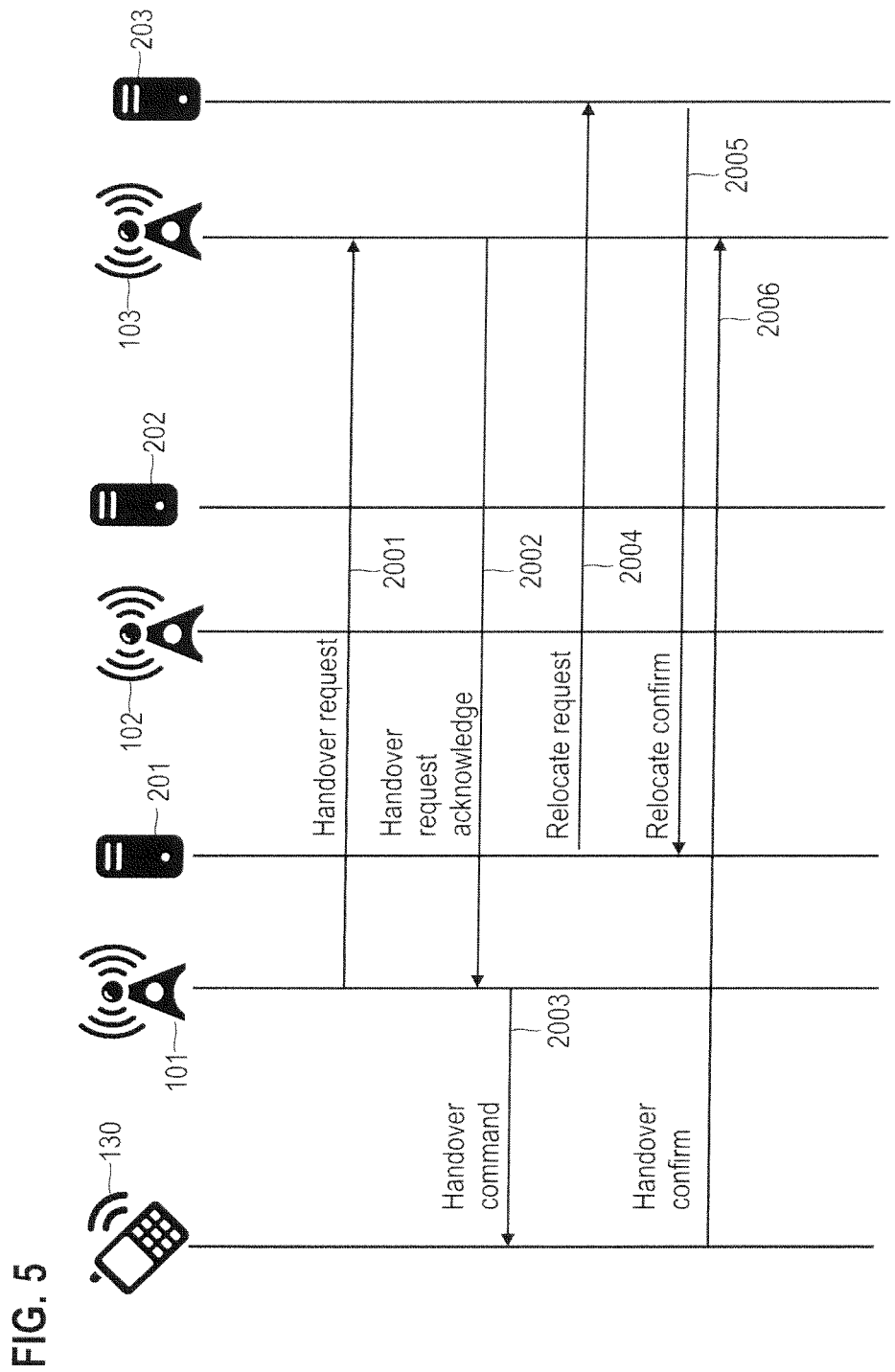
FIG. 5 is a signaling diagram of the radio access network and the ME system according to various embodiments.

FIG. 5 illustrates aspects with respect to relocating a service from a source ME server 201 to a target ME server 203. In particular, FIG. 5 illustrates aspects with respect to the handover. For example, the signaling illustrated in FIG. 5 may correspond to block 1007 is illustrated in FIG. 4.

At one point in time, handover request 2001 is sent from the source base station 101 to the target base station 103. For example, the handover request 2001 may be sent at the point in time indicated by the timing information which has also been signaled to the ME system 200.

After receiving the handover request 2001, the target base station 103 responds with the handover request acknowledgment 2002. Then, the source base station 101 sends the handover command 2003 to the terminal 130.

While the terminal 130 disconnects from the source base station 101, the source ME server 201 sends a relocate request message 2004 to the target ME server 203. This may be in accordance with the timing information of control message 1005. For example, as part of the relocate request message 2004, the validity of the shadow copy provided in a local cache of the target ME server 203 may be checked. For example, the validity is successfully checked, this may be indicated in the relocate confirm message 2005 with which the target ME server 203 responds to the source ME server 201. If the validity is not successfully checked, additional data to bring the shadow copy up to date can be transmitted from the source ME server 201 to the target ME server 203. This may be only the changed data since the last synchronization of the shadow copy. Thereby, the amount of data is reduced. Thereby, latency in the relocation is reduced.

Because the shadow copy is pre-provisioned at the target ME server 203, it is not required that data is included in the relocate request message 2004 which relates to such elements as the application context of the service; the operational state of the processing unit of the source ME server 201 executing the service 1001; and a program code of the service 1001. Such data can be pre-provisioned as part of the shadow copy. Because of this, it is possible to execute the relocation in a very short time duration.

For example, in the scenario FIG. 5 the relocation is completed even before the terminal 130 connects with the target base station 103 and sends a respective handover confirmation message 2006. For example, before being able to send the handover confirmation message 2006, the terminal 130 may be required to acquire the timing and/or frequency of the target base station 103 and access a random access channel of the radio channel 151 on which the target base station 103 is listening. This may introduce some latency which, in the example of FIG. 5, is larger than the latency due to relocation of the service 1001. Thus, the user of the UE 130 may only experience a simple glitch when executing the service—instead of multiple glitches in reference implementations.

While with respect to FIGS. 4 and 5 examples have been described where there are two candidate ME service 202, 203, in other examples, it is possible that there is a smaller or larger number of candidate ME service 202, 203.

Figure 6:
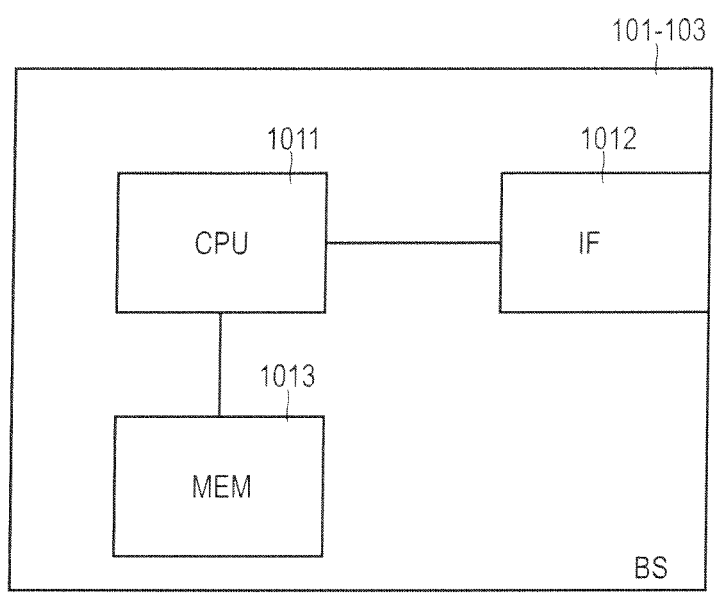
FIG. 6 schematically illustrates the base stations of the radio access network according to various embodiments.

FIG. 6 illustrates aspects with respect to the base stations 101-103. The base stations 101-103 include a processor 1011, e.g., a multi-core processor. The base stations 101-103 further include an interface 1012. The processor 1011 can communicate via the interface 1012, e.g., with entities of an ME system 260 and/or on the radio channel 151 of the respective radio access network 150 with a UE. Further, the base stations 101-103 include a memory, e.g., a non-volatile memory 1013. It is possible that control instructions are stored by the memory 1013. The control instructions can be executed by the processor 1011. Executing the control instructions can cause the processor 1011 to perform various techniques as described herein, e.g., related to a handover, providing an ME service to a UE, etc.

Figure 7:
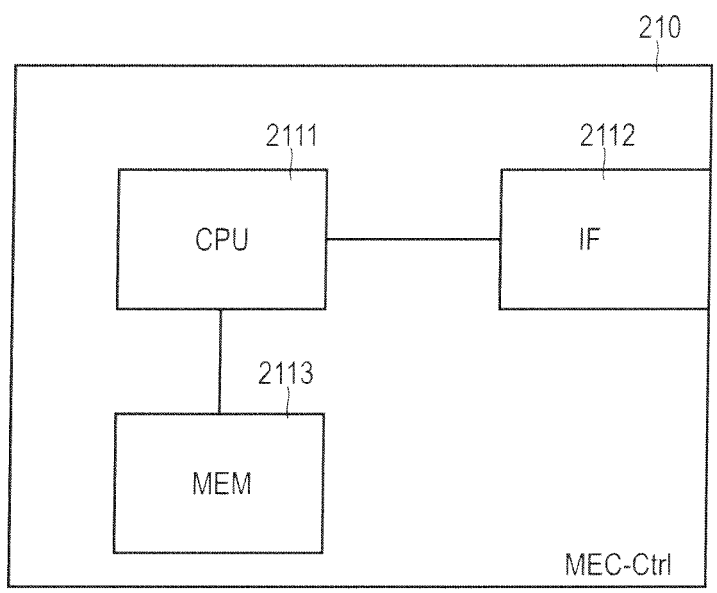
FIG. 7 schematically illustrates the ME control node of the ME system according to various embodiments.

FIG. 7 illustrates aspects with respect to the ME control node 210. The ME control node 210 includes a processor 2111, e.g., a multi-core processor. The ME control node 210 further includes an interface 2112. The processor 2111 can communicate via the interface 2112, e.g., with entities of the ME system 200 and/or the base stations 101-103 of the radio access network 150 of the cellular network 100. Further, the ME control node 210 includes a memory 2113, e.g., a non-volatile memory. It is possible that control instructions are stored by the memory 2113. The control instructions can be executed by the processor 2111. Executing the control instructions can cause the processor 2111 to perform various techniques as described herein, e.g., related to triggering relocation not a service from a source ME server to a target ME server.

Figure 8:
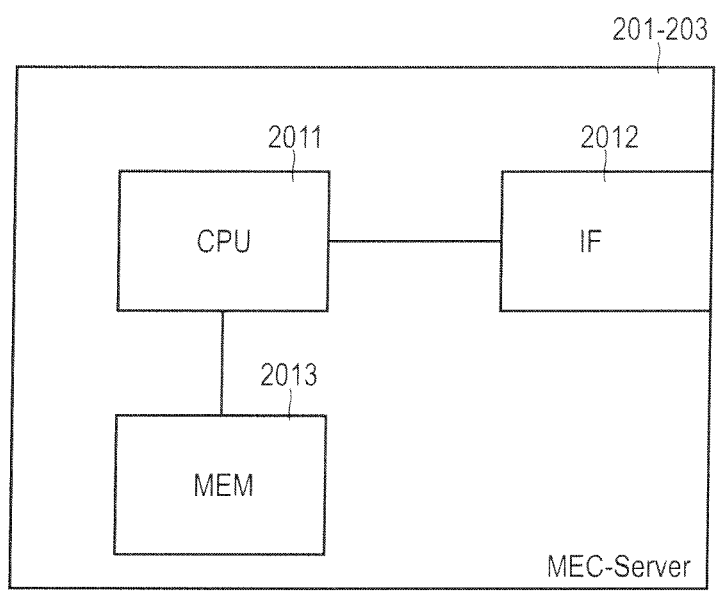
FIG. 8 schematically illustrates the ME servers of the ME system according to various embodiments.

FIG. 8 illustrates aspects with respect to the ME servers 201-203. The ME servers 201-203 include a processor 2011, e.g., a multi-core processor. The ME servers 201-203 further include an interface 2012. The processor 2011 can communicate via the interface 2012, e.g., with further entities of the ME system 200 and/or the base stations 101-103 of the radio access network 150 of the cellular network 100. Further, the ME servers 201-203 include a memory 2013, e.g., a non-volatile memory. It is possible that control instructions are stored by the memory 2013. The control instructions can be executed by the processor 2011. Executing the control instructions can cause the processor 2011 to perform various techniques as described herein, e.g., related to relocating a service from a source ME server to a target ME server and providing a service via an associated base station 101-103 to a UE 130.

Figure 9:
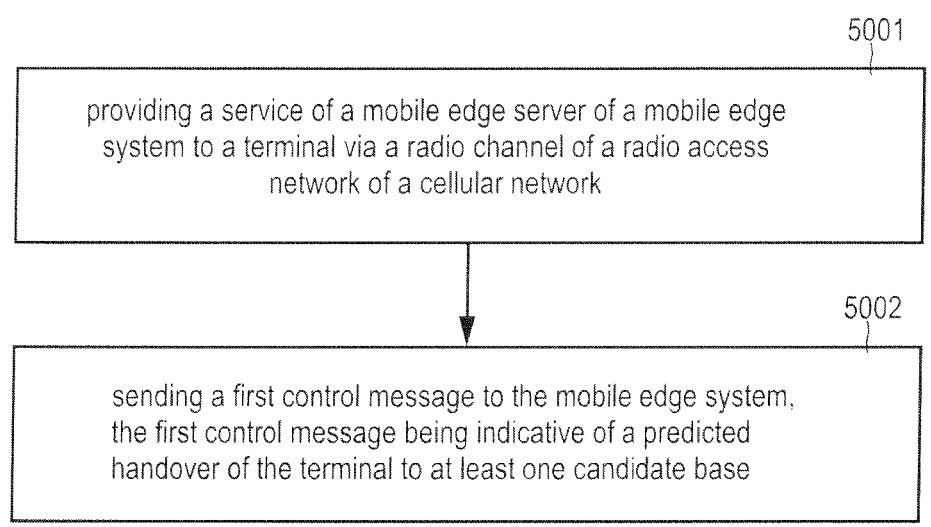
FIG. 9 is a flowchart of a method according to various embodiments.

FIG. 9 is a flowchart of a method according to various examples. For example, the method according to FIG. 9 may be implemented by one of the base stations 101-103.

At 5001, a service of an ME server is provided to a UE via a radio channel of a radio access network of a cellular network. 5001 may involve forwarding data packets to and from the ME server and from and to the UE.

Next, at 5002, a control message is sent to the ME system. The control message is indicative of a predicted handover of the terminal to at least one candidate base station. For example, the control message may include an identity of the at least one candidate base station. For example, the control message may include a timing information which is indicative of a time duration until the handover or which is indicative of a point in time at which the handover is likely to be executed.

FIG. 10 is a flowchart of a method according to various examples. For example, the method according to FIG. 10 may be implemented by the ME control node 210.

At 5011, control message is received. The control message is indicative of a predicted handover of a terminal from a source base station to at least one candidate base station. For example, the control message may include a timing information which is indicative of a time duration until the handover or which is indicative of a point in time at which the handover is likely to be executed. For example, the control message may include identity of the at least one candidate base station.

For example, based on the control message it is possible to plan implementation of the shadow copy at the at least one candidate base station. For example, based on a comparison of the amount of data required to be transmitted to the candidate base station with the time until the execution of the handover, implementation of the shadow copy can be postponed as much as possible in order to reduce resource allocation at the at least one candidate base station.

For example, the control message may be indicative of a ranking of the likelihood with which each candidate base station will be target base station. This may be taken into account when deciding where to implement the shadow copy: Thereby, resource allocation can be limited.

Figure 11:
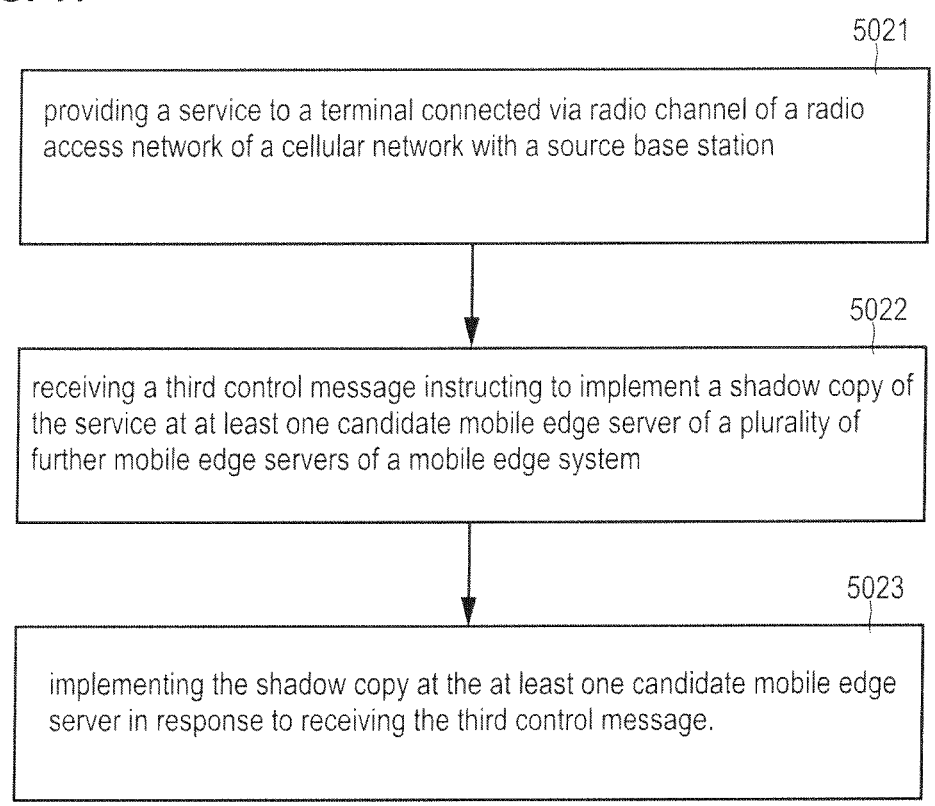
FIG. 11 is a flowchart of a method according to various embodiments.

FIG. 11 is a flowchart of a method according to various examples. For example, the method according to FIG. 11 may be implemented by one of the ME servers 201-203.

At 5021, a service is provided to the terminal. The terminal is connected via radio channel of a radio access network of a cellular network with a source base station.

At 5022, control message is received. The control message instructs to implement a shadow copy of the service at least one candidate ME server.

Then, at 5023, the shadow copy can be implemented. This may involve sending data related to the service to the at least one candidate ME server.

Optionally, following 5023, the shadow copy can be constantly updated by repeatedly synchronizing the service with the shadow copy. For example, user input may be forward it to the at least one candidate ME server to facilitate updating of the shadow copy.

Figure 12:
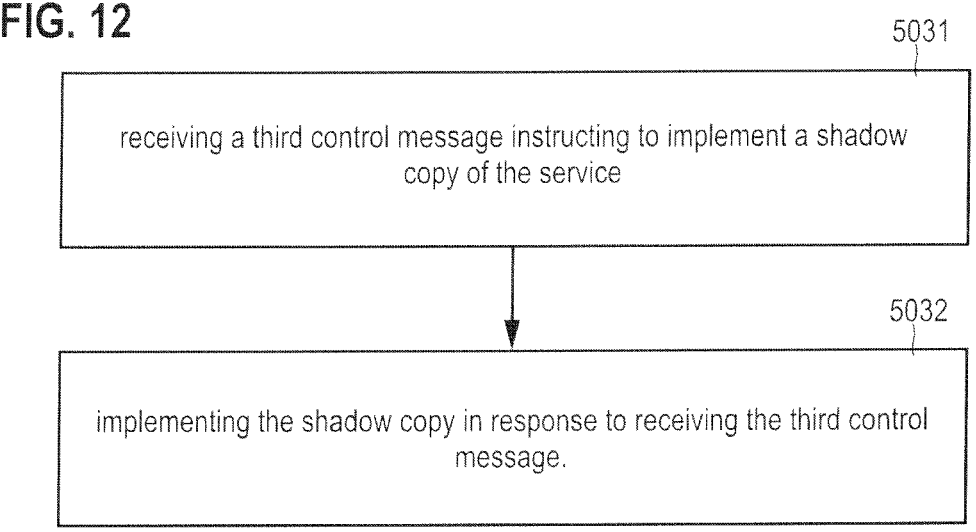
FIG. 12 is a flowchart of a method according to various embodiments.

FIG. 12 is a flowchart of a method according to various examples. For example, the method according to FIG. 12 may be implemented by one of the ME servers 201-203.

At 5031, a control message is received. The control message instructs to implement a shadow copy of a service currently provided by a source ME server.

Next, at 5032, the shadow copy is implemented. This may involve receiving data related to the service from the source ME server.

Optionally, following 5032, the shadow copy can be constantly updated by repeatedly synchronizing the service with the shadow copy.

Summarizing, above, techniques of relocating a service from a source ME server to the target ME server has been described. Such techniques employ, according to some examples, a shadow copy—sometimes also referred to a shadow instance—which is running in parallel to the service at the target ME server and facilitates implementation of a hot-swap relocation. For example, while the active instance of the service at the source ME server and the shadow copy at the target ME server run in parallel, user input may be sent from the source ME server to the target ME server so that the active state of the service are maintained in, both, the source ME server, as well as the target ME server. Once the target ME servers has control and hosts the service, resources that are allocated in the ME server not serving the UE can be released.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For example, while in some examples the mobile edge control node is shown as a separate entity, in other examples the mobile edge control node may be implemented at a mobile edge server.

The invention claimed is:

1. A base station of a radio access network of a cellular network, comprising:
at least one interface configured to communicate with a terminal and to communicate with a mobile edge server of a mobile edge system, and
at least one processor configured to provide a service of the mobile edge server to the terminal,
wherein the at least one processor is further configured to send a first control message to the mobile edge system, the first control message being indicative of a predicted handover of the terminal from the base station to one or more candidate base stations of the radio access network.

2. The base station of claim 1,
wherein the at least one processor is configured to send a second control message to the mobile edge system, the second control message being indicative of execution of the predicted handover to a target base station selected from the one or more candidate base stations.

3. The base station of claim 2,
wherein the first control message and/or the second control message comprises a timing information,
wherein the at least one processor is configured to execute the handover in accordance with the timing information.

4. A mobile edge control node of a mobile edge system, comprising:
at least one interface configured to communicate with a plurality of base stations of a radio access network of a cellular network and to communicate with a plurality of mobile edge servers of the mobile edge systems associated with the plurality of base stations, and
at least one processor configured to receive a first control message indicative of a predicted handover of a terminal from a source base station of the plurality of base stations to one or more candidate base stations of the plurality of base stations.

5. The mobile edge control node of claim 4,
wherein the at least one processor is configured to check if a source mobile edge server associated with the source base station is different from one or more candidate mobile edge servers associated with the one or more candidate base stations.

6. The mobile edge control node of claim 4,
wherein the source base station is associated with a source mobile edge server and wherein the one or more candidate base stations are associated with one or more candidate mobile edge servers different from the source mobile edge server,
wherein the at least one processor is configured to send a third control message instructing to implement a shadow copy of a service provided by the source mobile edge server via the source base station to the terminal at the one or more candidate mobile edge servers.

7. The mobile edge control node of claim 4,
wherein the at least one processor is configured to receive a second control message from the source base station, the second control message being indicative of execution of the predicted handover to a target base station selected from the one or more candidate base stations.

8. The mobile edge control node of claim 6,
wherein the at least one processor is configured to receive a second control message from the source base station, the second control message being indicative of execution of the predicted handover to a target base station selected from the one or more candidate base stations, and
wherein the at least one processor is configured to trigger relocation of the service from the source mobile edge server to a target mobile edge server associated with the target base station based on the shadow copy and in response to receiving the second control message.

9. The mobile edge control node of claim 8,
wherein the first control message and/or second control message comprises a timing information,
wherein the at least one processor is configured to trigger relocation of the service in accordance with the timing information.

10. A mobile edge server of a mobile edge system, comprising:
at least one interface configured to communicate with a source base station of a radio access network of a cellular network, with a mobile edge control node of the mobile edge system, and with a plurality of further mobile edge servers, and
at least one processor configured to provide a service to a terminal connected via a radio channel of the radio access network with the source base station,
wherein the at least one processor is further configured to receive a third control message instructing to implement a shadow copy of the service at one or more candidate mobile edge servers of the plurality of further mobile edge servers,
wherein the at least one processor is further configured to implement the shadow copy at the one or more candidate mobile edge servers, prior to a handover of the terminal from the source base station, in response to receiving the third control message.

11. The mobile edge server of claim 10,
wherein the at least one processor is configured to repeatedly synchronize the service with the shadow copy at the one or more candidate mobile edge servers.

12. The mobile edge server of claim 10,
wherein the at least one processor is configured to relocate the service to a target mobile edge server selected from the one or more candidate mobile edge servers based on the shadow copy and in response to being triggered by the mobile edge control node.

13. The mobile edge server of claim 12,
wherein the at least one processor is configured to relocate the service to the target mobile edge server in accordance with a timing information provided by the mobile edge control node.

14. The mobile edge server of claim 12,
wherein the at least one processor is configured to check validity of the shadow copy at a target mobile edge server when relocating the service to the target mobile edge server.

15. The mobile edge server of claim 10,
wherein the shadow copy comprises at least one of the following: an application context of the service; an operational state of at least one processing unit executing the service; and a program code of the service.

16. A mobile edge server of a mobile edge system, comprising:
at least one interface configured to communicate with a target base station of a radio access network of a cellular network, with a mobile edge control node of the mobile edge system, and with a source mobile edge server, and
at least one processor configured to receive a third control message instructing to implement a shadow copy of a service provided by the source mobile edge server to a terminal,
wherein the at least one processor is further configured to implement the shadow copy, prior to a handover of the terminal to the target base station, in response to receiving the third control message.

17. The mobile edge server of claim 16,
wherein the at least one processor is configured to relocate the service from the source mobile edge server based on the shadow copy and in response to being triggered by the mobile edge control node.

18. The mobile edge server of claim 17,
wherein the at least one processor is configured to activate the shadow copy as a live instance of the service when relocating the service,
wherein the at least one processor is configured to provide the service to the terminal connected via a radio channel of the radio access network with the target base station in response to said activating the shadow copy as the live instance.

* * * * *